(12) United States Patent
Pica

(10) Patent No.: US 6,845,941 B2
(45) Date of Patent: Jan. 25, 2005

(54) ROTARY/FIXED WING AIRCRAFT

(76) Inventor: Bret D. Pica, 2275 Illinois Ave., Boise, ID (US) 83706

( * ) Notice: Subject to any disclaimer, the term of this patent is extended or adjusted under 35 U.S.C. 154(b) by 0 days.

(21) Appl. No.: 10/456,032

(22) Filed: Jun. 4, 2003

(65) Prior Publication Data

US 2004/0113013 A1 Jun. 17, 2004

Related U.S. Application Data

(60) Provisional application No. 60/386,031, filed on Jun. 4, 2002.

(51) Int. Cl.[7] .......................... B64C 27/22; B64C 39/00
(52) U.S. Cl. ......................... 244/10; 244/7 A; 244/7 R
(58) Field of Search ......................... 244/10, 7 A, 7 R, 244/12.2, 17.11, 23 C, 8

(56) References Cited

U.S. PATENT DOCUMENTS

| | | | | |
|---|---|---|---|---|
| 2,743,885 A | * | 5/1956 | Peterson | ..................... 244/7 R |
| 2,886,260 A | * | 5/1959 | Peterson | ..................... 244/7 R |
| 3,108,764 A | * | 10/1963 | Sudrow | ..................... 244/23 C |
| 3,129,905 A | * | 4/1964 | Taylor | |
| 4,307,856 A | * | 12/1981 | Walker | ..................... 244/12.2 |
| 5,190,242 A | * | 3/1993 | Nichols | ..................... 244/12.2 |
| 5,503,351 A | * | 4/1996 | Vass | ..................... 244/23 C |
| 5,746,390 A | * | 5/1998 | Chiappetta | |
| 6,086,016 A | * | 7/2000 | Meek | ..................... 244/17.11 |
| 6,450,446 B1 | * | 9/2002 | Holben | ..................... 244/23 C |

* cited by examiner

Primary Examiner—Michael J. Carone
Assistant Examiner—Lulit Semunegus
(74) Attorney, Agent, or Firm—Frank J. Dykas; Dykas, Shaver & Nipper

(57) ABSTRACT

A rotor system that allows an aircraft to operate as a helicopter and as an airplane is disclosed. The invention incorporates an annular airfoil attached at the tips of the rotor blades. The rotor system stops and is secured from rotation for operation at high forward speeds. The annulus acts as the primary lifting surface in airplane mode at high speed. The rotor blades incorporate leading and trailing edge flaps for control in transitional and fixed wing flight modes.

11 Claims, 6 Drawing Sheets

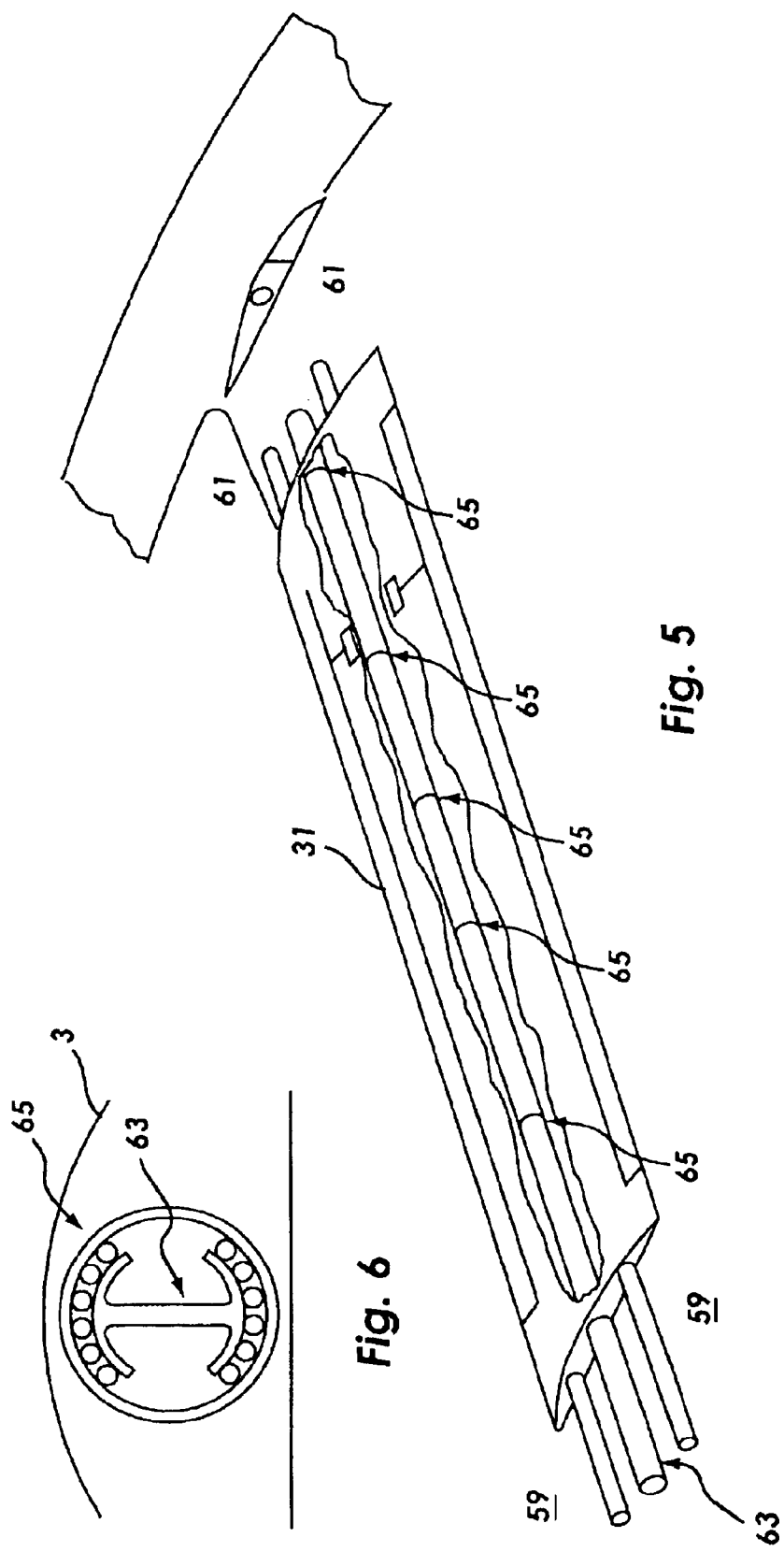

ROTARY/FIXED WING AIRCRAFT

DESCRIPTION

This application claims priority of provisional application Ser. No. 60/386031, entitled "Rotary/Fixed Wing Aircraft" filed on Jun. 4, 2002, which is incorporated herein by this reference.

RELATED ART

U.S. Pat. No. 2,455,866 to Kaman describes rotor servo flaps.

U.S. Pat. No. 3,253,805 to Taylor describes an aircraft with a substantially annular wing.

U.S. Pat. No. 4,560,358 to Adler describes a gliding ring with a separator lip.

U.S. Pat. No. 4,711,415 to Binden describes an X-Wing aircraft.

U.S. Pat. No. 6,161,799 to Nyhus describes a rotor blade lock system for rotary/wing aircraft.

U.S. Pat. No. 6,170,779 to Nyhus describes a rotor pitch lock system for rotary/wing aircraft U.S. Pat. No. 6,231,013 to Jaenker describes an airfoil member with a piezoelectrically actuated servo-flap.

"Solid State Rotor Tested", Paul Proctor, Aviation Week and Space Technology, Apr. 15, 1996 p. 46, is a relevant reference regarding a piezoelectric torque-plate adaptive rotor.

BACKGROUND OF THE INVENTION

1. Field of the Invention

The present invention relates to hybrid aircraft capable of operating as a rotary wing aircraft and as a fixed wing aircraft.

2. Background of the Invention

A functional, preferably single rotor, hybrid aircraft capable of carrying a plurality of passengers with a substantial payload has not been successfully developed. The military, commercial and private benefits of a vehicle that can take off vertically, transition from low to high speed forward flight and back to low speed flight for vertical landing are well known.

Vibration, structural and aerodynamic barriers presently practically prevent the use of high speed rotary wings. The primary barrier to high speed helicopter flight is that the retreating rotor blade in high speed forward flight will stall because its effective airspeed approaches zero at a set rotational velocity. Conversely, the advancing rotor blade sees a higher airspeed. Because lift vanes as the square of airspeed, the lower airspeed on the retreating blade requires a larger pitch angle of attack than the advancing blade. As the retreating blade airspeed velocity vector sum approaches zero the pitch angle will approach an angle of attack where a blade stall will occur. One way to avoid these stall barriers is stopping the rotor blades in flight when a sufficient forward air speed has been obtained.

The challenge in stopping the rotor is similar to that of high speed flight. Sufficient forward speed of the rotor relative to the aircraft must be achieved and maintained to lift the aircraft as the rotor is stopped. The retreating blade will see a reduction in airspeed to zero and then the airflow will reverse before the rotor system stops. Because of this the control sequence for the retreating blade must also be reversed while the rotor system is rotating before it is stopped.

There will be a period of time when the retreating rotor blade cannot provide any control or lift to the aircraft because of its near zero relative airspeed. The range of vehicle airspeed in which the rotor blade cannot provide control or lift is bound by the retreating rotor blade stall speed, and its stall speed when the airspeed reverses as the net airspeed increases and the blade rotation slows. For control, the aerodynamic lift characteristics must be the same in both directions, therefore the blade must be effectively symmetrical in cross section at all times.

The aerodynamic requirements of high speed fixed rotor flight contrast with the aerodynamics of low speed rotary wing flight. During fixed rotor flight a given surface area is required at a given airspeed to avoid stalling. The slower the airspeed the larger the surface area required. It is advantageous to transition from fixed wing flight to rotational flight at low to moderate airspeeds for control and structural reasons. Therefore, a larger surface area is preferred. However, during rotational flight higher airspeed is typically seen over the rotor blades because of the added angular velocity. Thus a smaller surface area is sufficient to provide lift. Therefore, a larger surface area during rotational flight is detrimental to efficiency and control responsiveness.

Taylor in U.S. Pat. No. 3,253,805 describes an annular lifting surface with an airfoil shape. The annulus is attached to the aircraft and acts as a fixed wing and does not provide for rotation of the wing. Furthermore, the annulus is drawn with a substantially larger forward airfoil section than the rear section. This configuration is not suited for rotation due to the eccentricity of the shape and corresponding asymmetrical moment of inertia.

Binden in U.S. Pat. No. 4,711,415 describes rotor locking with an X-wing aircraft. The X-wing aircraft disclosed therein employs compressed air slots which modulate to control the rotor profile in rotational, transitional and locked rotor flight. This mechanism was investigated throughout the 1980's, but was not commercially introduced, possibly due the complexity and cost issues of the test program. A particularly challenging issue in this design is the forward swept nature of the aft rotor blades which act as a primary lifting surface in forward, fixed-wing flight. Instability with aerodynamic surfaces of this nature are well known and place demanding loads both on structure and on flight control mechanisms.

SUMMARY OF THE INVENTION

It is an object of this invention to provide a rotor system capable of rotational flight, fixed wing flight, and the transition between these two modes.

It is a further object of this invention to provide a rotor system capable of transitional flight over a range of airspeeds, thereby giving the pilot or flight crew more options.

It is a further object of this invention to provide a rotor system capable of said objects of invention substantially employing proven, practical and reliable mechanisms.

It is a further object of this invention to provide a rotor system mounted as a modification to existing helicopter designs or retrofitted on existing helicopters to enhance the economic viability of incorporating the invention.

It is a further object of tis invention to provide a rotor system capable of carrying a multiplicity of passengers and/or payload in a useful capacity.

The present invention achieves these objectives by preferably incorporating an annular wing in conjunction with adjustable rotor blades. An aircraft equipped with the preferred embodiments of the present invention will lift off from the ground with the operating characteristics of a rotary wing aircraft in helicopter mode. When high speed flight is desired the aircraft accelerates above a low transitional mode speed limit, the rotor system is disengaged, rotor blade rotational motion is stopped, and the rotor blades are secured in a fixed configuration for fixed wing mode. Lift is substantially transferred from the rotor blades to the annular wing during the transition mode. Rotor blade flaps are employed in a unique and novel manner to facilitate control during helicopter, transitional and fixed wing modes.

The rotor blades of the preferred embodiment extend radially from a rotating hub. Preferably, the blade cross section is symmetric about its vertical center. An interior structural beam or spar also extends longitudinally and interior to the rotor blade through the center of the blade. The blade pitches around the spar by means of bearings positioned along its length to distribute aerodynamic loads from the blade. The spar root is fixed to the rotating hub and the spar tip is fixed to the annular wing. The rotor blade pitch is controlled in a conventional helicopter fashion by a swashplate and linkage system. Conventionally, the blade pitch is varied to effectively tilt die rotor disk which is conventionally comprised of the rotating blades. According to the present invention, the annular wing tilts with the blades.

The annular wing is a revolution of an aerodynamic cross section about a fixed geometric center that coincides with the center of a rotor shaft. Said annular wing's center of gravity also coincides with die geometric center of said annulus. Preferably, the annular wing's center of lift will coincide with the geometric center of the annular wing by incorporating aerodynamic cross sections similar in function to those disclosed by Adler in U.S. Pat. No. 4,560,358. The annular wing provides a substantial portion of the lift in high speed forward flight. In rotational, low speed flight the annular wing is not a substantial contributor to the overall lift of the aircraft.

However, because the annular wing and rotor blades effectively comprise the rotor disk, the annular wing's aerodynamic characteristics must be considered at moderate speeds where transition will occur to fixed wing mode. The annular wing has an angle of attack that describes the angle between its pitch and the relative wind. When the rotor disk tilts to provide horizontal motion the annular wings the angle of attack changes and may become disadvantageous. An airfoil typically achieves zero lift at an angle of attack negative to its chord line. This angle must be considered in the design of the annular wing and also the flight control system to limit adverse effects of negative lift of the annular wing versus the positive lift of the rotor blades as the airspeed increases.

Control of the aircraft is provided by two independent systems. A conventional helicopter control system is used to control the aircraft in helicopter mode. The second system is comprised preferably of piezoelectric actuated rotor flaps that provide aircraft control in transition mode and fixed wing mode. Piezoelectric actuators are described by Jaenker in U.S. Pat. No. 6,231,013 which is incorporated herein by this reference. Also, directionally-attached piezoelectric (DAP) torque plates at the rotor blade roots are discussed in Aviation Week and Space Technology, Apr. 15, 1996 p. 46, which is attached to my provisional application, serial No. 60/386,031, which is incorporated herein by this reference.

A conventional helicopter control system is used in rotary wing mode. Control inputs are made to a conventional swashplate system of which linkages are attached to the rotor blades. The linkages can be attached to either the forward or rear portion of the rotor blade. According to the present invention, the linkages rotate the blades around an internal beam by sliding on bearings.

Control systems are transferred from the swashplate system to the preferred piezoelectric actuators during transitional mode. After sufficient forward speed is obtained for the annular wing to provide lift, locking mechanisms engage from the rotor blades at their roots and interlock with the rotating hub. At the same instant, locking mechanisms engage from the rotor tips and interlock with the annular wing. The rotor blades can then be used in conjunction with die internal spars to transmit structural loads from the annular wing to the hub. This advantageously provides additional strength during high speed flight. Because the rotor blades cannot rotate about the longitudinal axis, the swashplate no longer provides flight control. An onboard computer transfers control to piezoelectric actuators on both leading and trailing edges of the rotor blades. Piezoelectric actuators are preferred due to their fast reaction times, and have been proven in a technology demonstrator. [See "Solid State Rotor Tested", Aviation Week and attached to my provisional application, Ser. No. 60/386,031, which is incorporated herein by this reference.] Aircraft propulsion is then transferred to a horizontal thrust producing engine which provides thrust substantially parallel to the longitudinal axis of the aircraft and maintains the forward velocity of the aircraft. The rotating rotor system is then disengaged from its power source. Said rotor system then undergoes angular deceleration with the assistance of a brake connected to the shaft system. As the rotor blades angular velocity slows the airspeed relative to the retreating blade will approach zero and reverse. When the relative airspeed is near zero the rotor flap will become ineffective and its direction of movement will effectively reverse as the airspeed reverses relative to typical helicopter rotation. The piezoelectric flaps are employed to provide rapid control during this transition. Use of the shaft brake will minimize the period when the retreating blade flap is ineffective. When the rotor system ceases to rotate, locking détentes, for example, correctly position the rotor wings for airplane mode. A blade locking system then engages at each of the swashplate linkages so that airplane flight loads will not be transmitted directly through the swashplate. The aircraft is then in airplane mode. Rotor blade locking and rotor blade pitch locking are described by Nyhus in U.S. Pat. Nos. 6,161,799 and 6,170,779 which are incorporated herein by this reference.

In airplane mode roll control is provided by the rotor blade flaps. Because all flaps can act independently they can be also be used to provide additional pitch control for either trim or guidance. Flight control surfaces on the aircraft fuselage can augment pitch and roll control as desired.

Reentry to helicopter mode is essentially the reverse operation. Airspeed is decreased below an upper transitional mode speed limit. Blade locking systems arc then released. Braking detents are released and power is re-engaged to the rotor system. After sufficient angular velocity is achieved, that the rotor blades can provide lift, and the rotor blade locking mechanisms are released at the roots and tips and control is returned to the swashplate system.

BRIEF DESCRIPTION OF THE DRAWING FIGURES

FIG. 5 is a partial perspective view of a rotor blade and portion of an annular wing according to the present invention;

FIG. 6 is a partial cross section schematic through a rotor blade showing a bearing according to the present invention;

DETAILED DESCRIPTION OF THE PREFERRED EMBODIMENTS OF THE INVENTION

Figure 1:
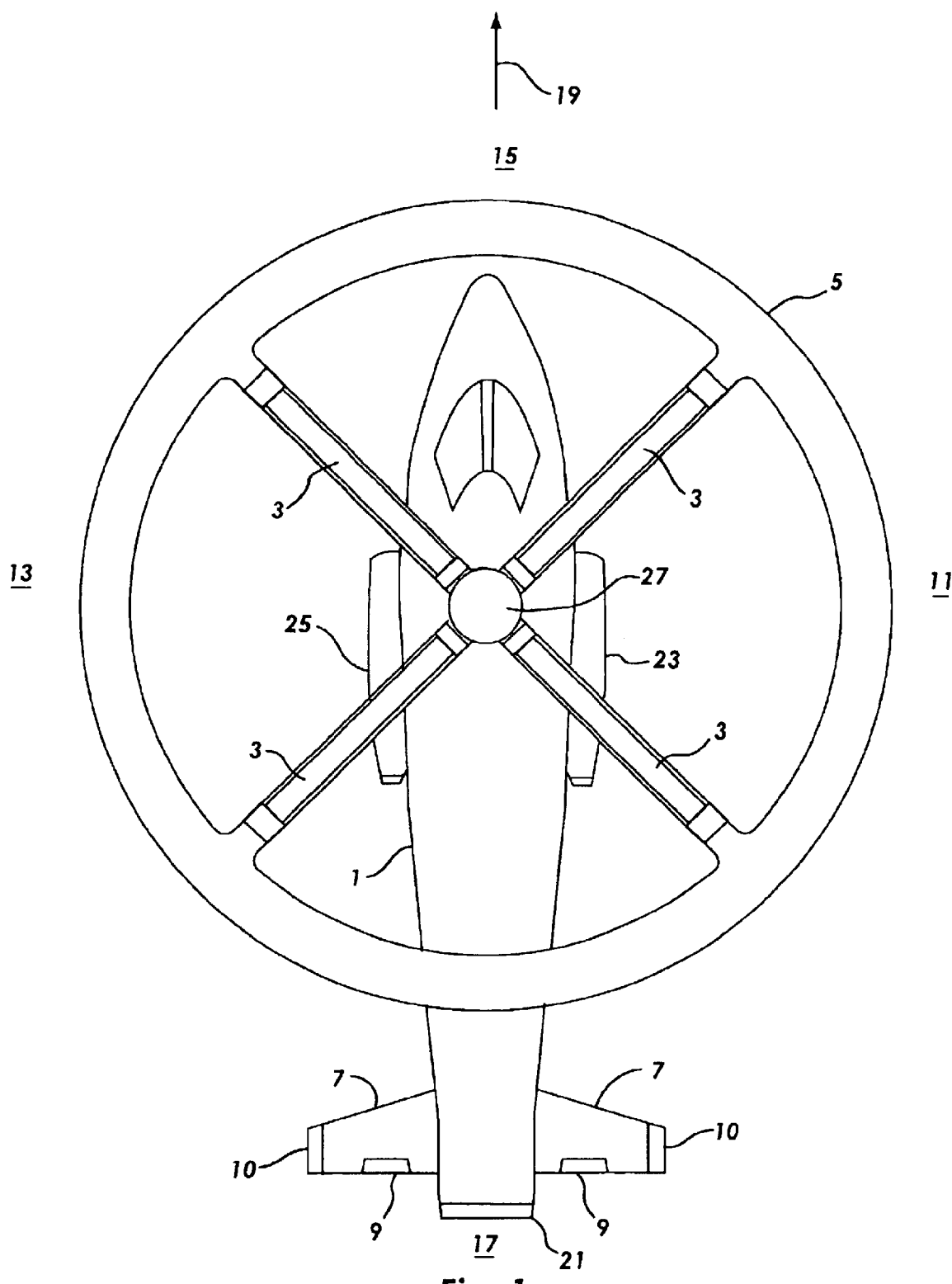
FIG. 1 is a diagrammatic plan view of a hybrid aircraft incorporating a rotor/wing with an enclosed annular airfoil according to the present invention.

The drawing figures are intended to illustrate the general manner of design and construction of the invention, and are not to scale. References, in the description and in the claims, to left, right, front, back and the like are used for descriptive purposes, and should not be misinterpreted as to limit the scope of the claims or invention. It shall be understood that the embodiment of the invention as described is capable of operation in other orientations than described or shown.

FIG. 1 illustrates an aircraft fuselage 1 equipped with an embodiment of the present invention comprised of rotor blades 3 of which any single rotor blade extends from rotating hub 27 to an annular wing 5. A horizontal stabilizer 7, elevators 9, and vertical stabilizers 10 on the fuselage 1 are common fixed wing aircraft embodiments. Aircraft directional references are right 11, left 13, nose 15, and tail 17. A longitudinal axis 19 extends lengthwise through the fuselage 1. A fan tail 21 or vectoring thrust tail may be advantageously used instead of an anti-torque rotor for rotary wing flight. A starboard powerplant 23 and port powerplant 25 may be comprised of a turbojet engine to produce horizontal thrust in fixed wing flight. Alternatively, a single jet engine (not shown) may be employed that can convert from shaft propulsion to thrust propulsion.

Figure 2:
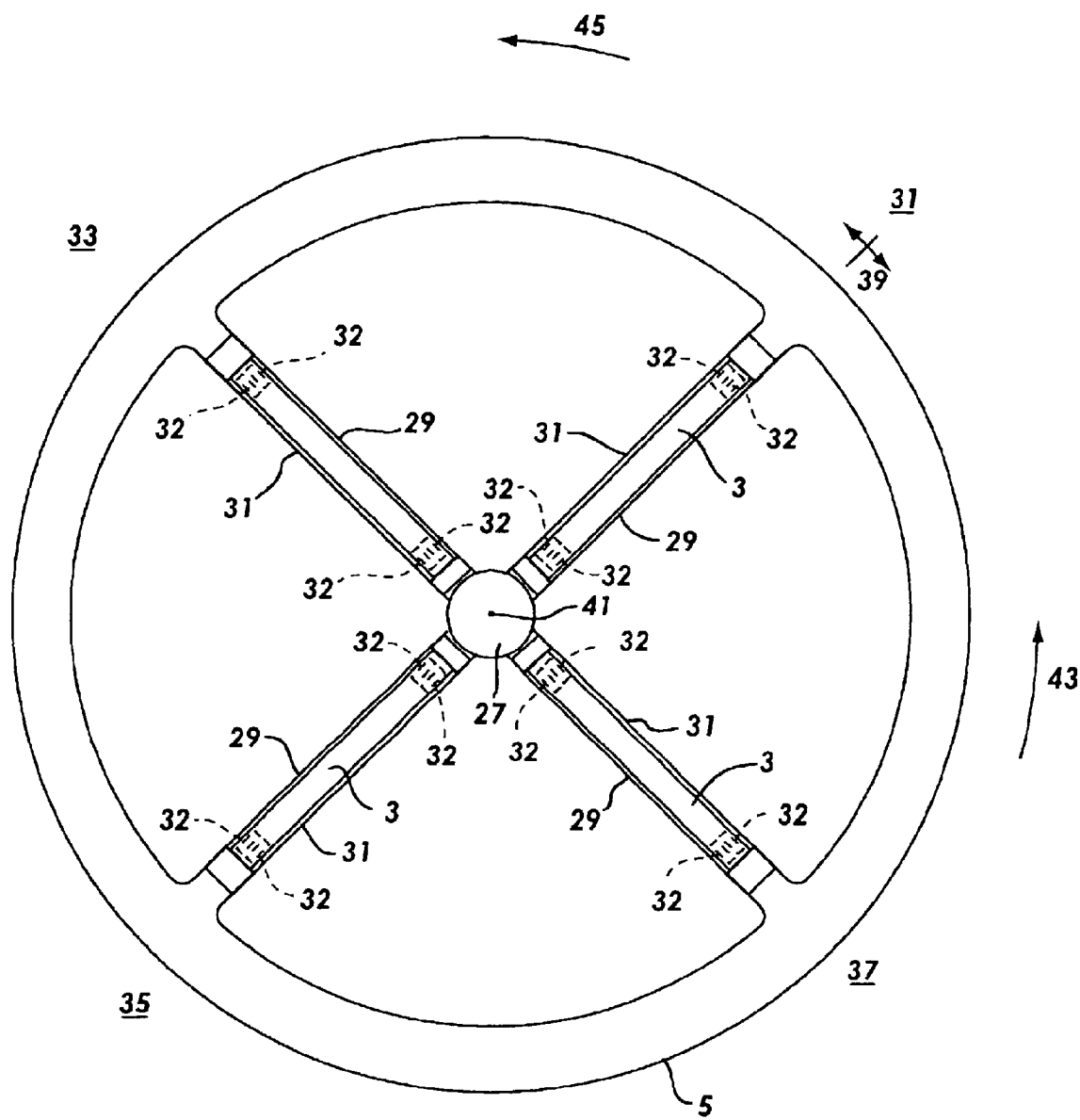
FIG. 2 is a diagrammatic plan detail view of a preferred embodiment of the rotor/wing of the present invention.

Now turning to FIG. 2, the preferred embodiment of the annular wing of the present invention is shown. Pivoting rotor blades 3 extend radially from hub root 27. Each rotor blade has edge flaps 29 and 31. Said edge flaps are preferably actuated by piezoactuators 32 shown in hidden view. Rotor blade positions for reference purposes are denoted as 31, 33, 35 and 37. Positional references 31 and 37 are used to illustrate the general airspeed and pitch over advancing rotor blades through an arc starting at the longitudinal axis line 19 extended through the tail 17 and ending at the longitudinal axis 19 extended through the nose 15. Positional references 33 and 35 are used to illustrate the general airspeed and pitch over retreating rotor blades through an arc starting at the longitudinal axis line 19 extended through the nose 15 and ending at the longitudinal axis line 19 extended through the tail 17. The rotor blades pitch about axis 39 and rotate about hub axis 41. Forward motion is referenced by directional arrow 43 and rotation is referenced by arrow arc 45.

Operational Description: Helicopter Mode

Figure 3:
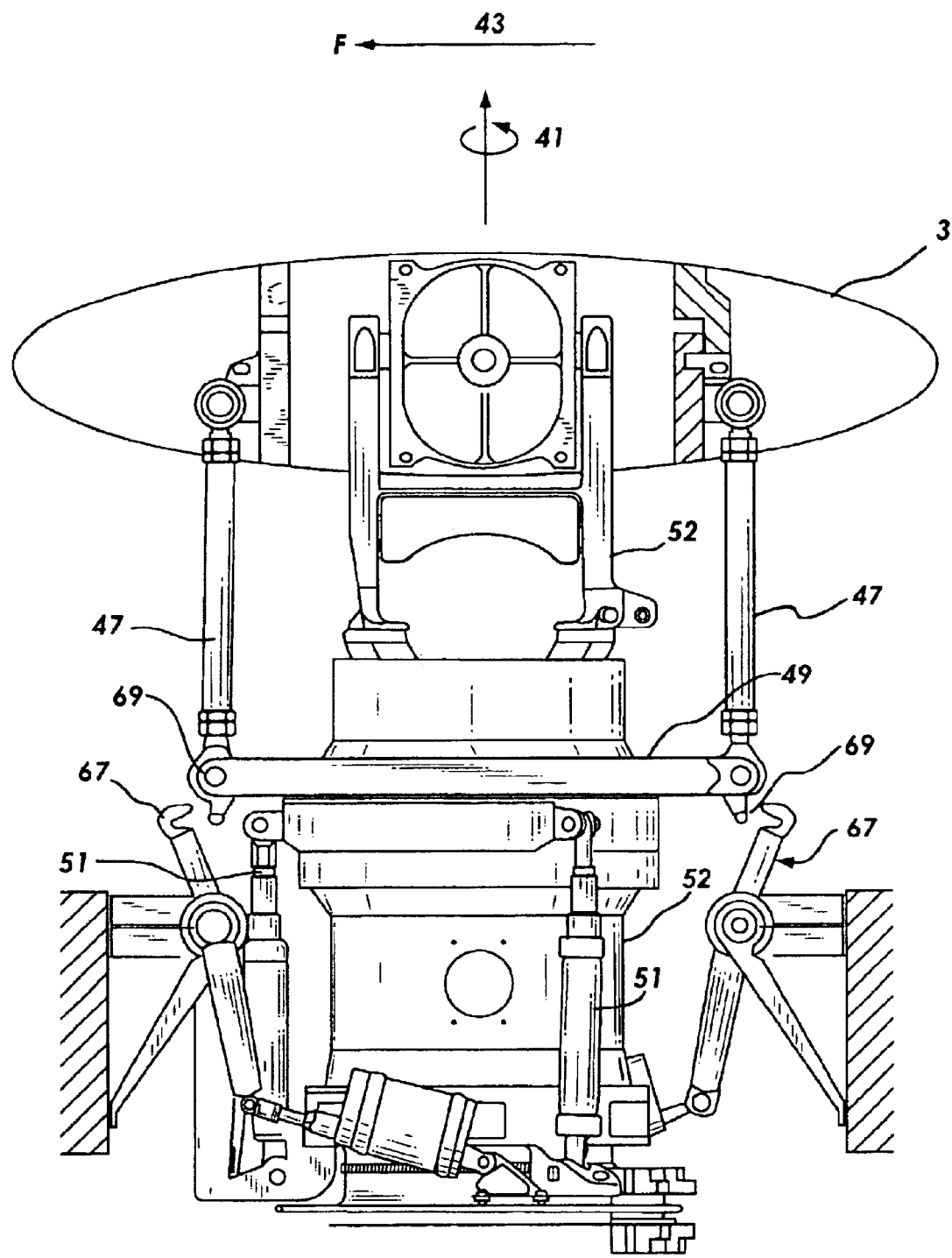
FIG. 3 is a partial cross section elevation view of a possible swashplate and control linkages according to the present invention.

Conventional helicopter mode control is provided by pitching rotor blades about axis 39 to effectively tilt the rotor disk comprised of the rotor blades 3. The disk is conventionally tilted by articulating the rotor blade pitch about a longitudinal axis 31 by linkages 47 connected to the rotating portion of a swashplate 49 shown in FIG. 3. By pitching the rotor blades the angle of attack is increased or decreased thereby changing the lift produced by the individual rotor blades 3. As the lift is increased on one of the rotor blades 3 that portion of the disk will experience a lifting force and the rotor disk will tilt. Likewise if the angle of attack is decreased the blade 3 will provide less lift and the disk will tilt. Because a swashplate 49 is used for control an increase in rotor blade pitch will result in a decrease in rotor blade pitch 180 degrees in position. Therefore, an increase in pitch on the rotor blade at position 31 will correspond to a decrease in pitch at the rotor blade in position 35. The other half of the swashplate 49 is non-rotational, and receives control inputs from fixed linkages that move according to flight control inputs by the pilot or a flight control computer. As the non-rotating swashplate 49 tilts the linkages 47 attached to the rotating portion vary the rotor blade pitch. The swashplate 49 can also be raised or lowered which will increase or decrease the rotor blade pitch and enables the helicopter to ascend or descend without horizontal motion. By tilting the rotor disk forward the aircraft helicopter will move forward 43. By tilting the disk left the helicopter will move left 13 from stationary flight or bank left if it is moving in a moderately forward direction 43. Likewise sideways or reverse motion can be obtained. There are an infinite number of movements possible in 360 degrees of direction. Any movement can be braked by tilting the rotor disk in the opposite direction.

Operational Description: Fixed Wing Mode

A fixed wing aircraft can be aerodynamically configured in a variety of ways to meet its lifting and control requirements. A conventional aircraft employs on primary lifting wing with ailerons, a horizontal stabilizer with an elevator and a vertical stabilizer with a rudder. The ailerons are used to provide roll control about a longitudinal axis. The elevator provides pitch control. The stabilizer and elevator can be replaced by a stabilator that rotates in its entirety and is controlled by a tab similar to a servo flap. The rudder provides yaw control. Variations of aircraft can employ multiple lifting wings, a canard wing which can also replace the horizontal stabilizer and elevator, multiple vertical stabilizers and combinations of any of these surfaces.

The preferred orientation of the rotor blades 3 in fixed wing mode is at a 45 degree angle to the longitudinal axis 19 of the fuselage. In this position edge flaps 29 at rotor blade positions 31 and 37 act as right trailing edge ailerons and edge flaps 31 at positions 33 and 35 act as left trailing edge ailerons. Said edge flaps can be positioned independently to efficiently trim and roll the aircraft. Some pitching moments may also be induced by the trailing edge flaps. Leading edge flaps 31 at positions 31 and 37 and leading edge flaps 29 at positions 33 and 35 may be fixed in neutral position in the preferred embodiment. However, they may also be used if additional rotor blade camber is desired in fixed wing mode.

Operational Description: Transition Mode

The preferred embodiment of the present invention allows for complete as possible aerodynamic control when transitioning from helicopter mode to airplane mode. Transition from helicopter mode to airplane mode is possible after the forward flight 11 airspeed exceeds the rotary wing's 5 stall speed. The swashplate 49 sets the rotating rotor blades at neutral pitch and aerodynamic control is transferred to edge flaps 29 and 31. Because the swashplate is fixed in a neutral position by actuators 51, moments induced by the edge flaps 29 and 31 to the rotor blades 3 will transmit a moment on the aircraft fuselage 1 thereby rolling the aircraft. Preferably, the actuation of said edge flaps will be minimal and used only to counter turbulent forces and to maintain the aircraft in a set flight path thereby saving wear and tear on swashplate 49.

Figure 4:
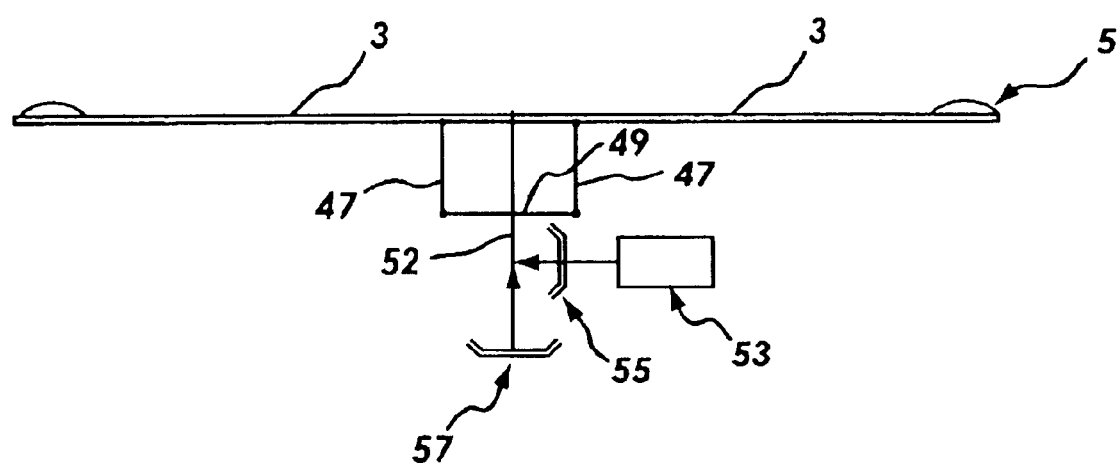
FIG. 4 is a schematic diagram of the rotor drive shaft system according to the present invention.

Now referring to FIG. 4 the rotor shaft 52 is then disengaged by clutch 55 from the powerplant 53 and rotor shaft brake 57 engages. As the rotor system's angular velocity slows aerodynamic control of the retreating blades at positions 33 and 35 becomes critical because the airspeed seen over the rotor blade will reverse. When the airspeed is near zero the retreating blade edge flaps 29 and 31 at positions 33 and 35 will be ineffective as control devices. Shaft brake 57 is specifically employed to reduce the time exposure to this condition.

Prior to the airspeed reversal edge flaps 29 modulate around the full rotation of axis 41 to control the aircraft roll about longitudinal axis 19 while edge flaps 31 may remain in a neutral position. For example, a left roll about longitudinal axis 19 will be induced if edge flaps 29 at positions 31 and 37 are lowered and if edge flaps 29 at positions 33 and 35 are raised or remain in an aerodynamically neutral position.

After the airspeed reversal edge flaps 29 at positions 31 and 37 may remain in neutral pitch while edge flaps 31 at said positions actuate to provide roll control. For example, the same roll prior to airspeed reversal would still be induced if edge flaps 29 at positions 31 and 37 are lowered and edge flaps 29 or 31 at positions 33 and 35 remain in neutral position. But, if additional rolling moment is desired edge flaps 31 at positions 33 and 35 are now raised while edge flaps 29 in said positions may remain an aerodynamically neutral position.

The transition to aircraft mode is completed when the rotor system angular velocity reaches zero. The rotor blades 3 preferably stop and lock rotation at the 45 degree angle indicated above for airplane mode. The rotor blades may be positionally locked about axis 41 by detents at the rotor brake 57. Latching hook 67 now engages with pin 69 and secures the rotor blades 3 directly to the fuselage 3 thereby relieving the swashplate 49 of fixed wing flight stresses. Now referring to FIG. 5, locking mechanisms 59 engage and interlock each rotor blade 3 with hub 27 thereby locking the rotor blade pitch at an angle of attack advantageous for fixed wing flight. Locking mechanisms 61 engage and interlock with annular wing 5.

The locking mechanisms 59 and 61 may be advantageously designed to transfer structural loading from the annular wing 5 to each rotor blade 3 and then to hub 27. The additional strength gained from using each rotor blade 3 as a support structure in conjunction with internal spar 63 enables spar 63 to be designed to support the aircraft in helicopter mode. The thickness of spar 63 is then minimized keeping the overall rotor blade 3 thickness to a minimum thereby reducing induced drag. The combined structural characteristics of rotor blade 3 and spar 63 can then be employed during high speed fixed wing flight.

During rotary wing flight rotor blade 3 aerodynamic forces are transferred to the internal spar 63 by bearings 65 distributed along spar 63. The bearings 65 provide an essentially frictionless interface between spar 63 and rotor blade 3 as shown in cross section in FIG. 6, and relieve the spar 63 of torsional stresses from rotor blade 3 which would otherwise be present in rotary wing flight.

DETAILED DESCRIPTION OF ALTERNATIVE EMBODIMENTS OF THE PRESENT INVENTION

Figure 7:
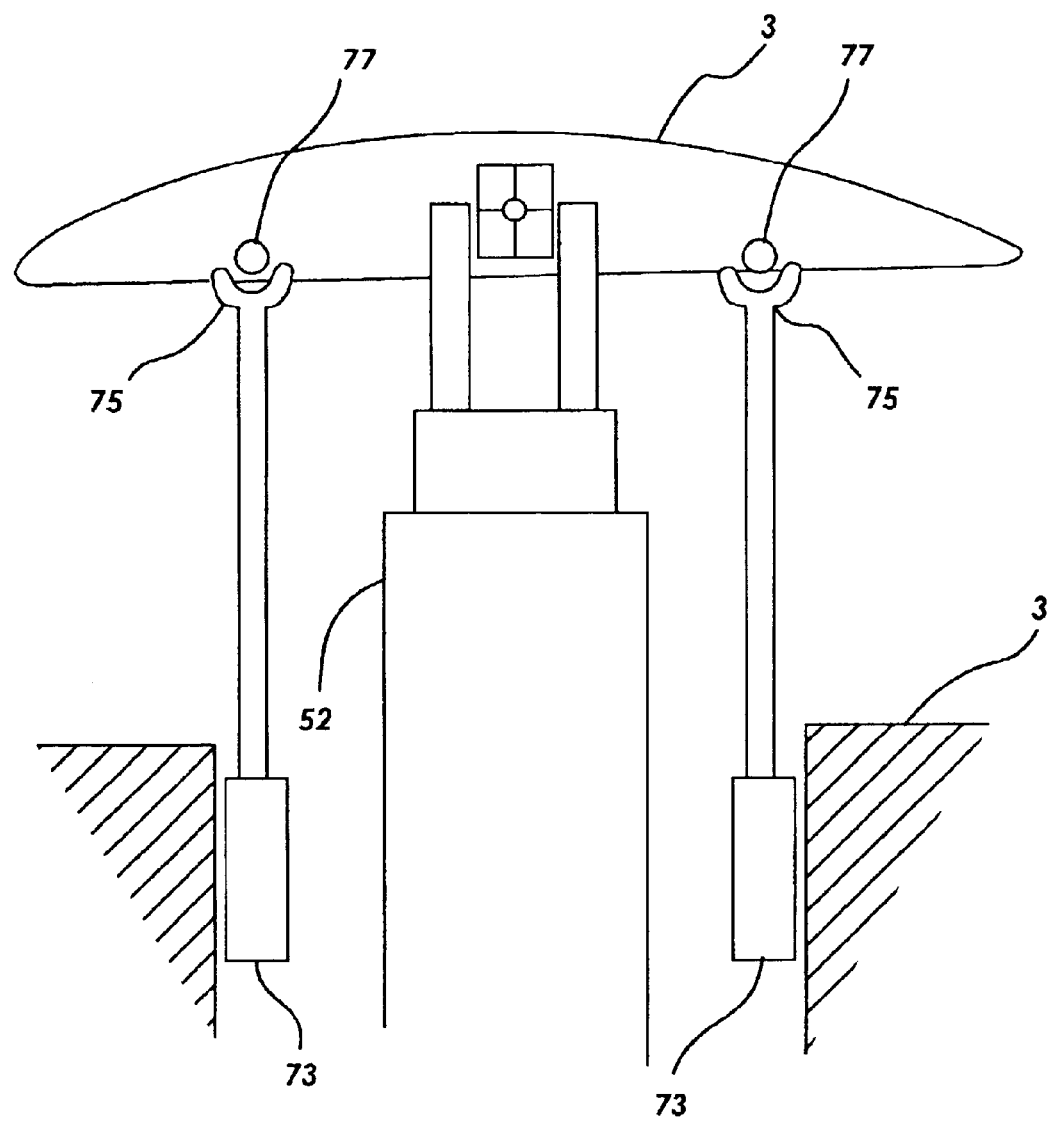
FIG. 7 is a schematic diagram illustrating a possible blade locking mechanisms according to the present invention.

An alternative embodiment may be the elimination of the swashplate/linkage control system in favor of rotor blade servo flaps 29 and 31 actuated by the piezoelectric actuators 32. This arrangement is advantageous because of the reduction in the required mechanical components. However, now referring to FIG. 7, linkages 71 would be required to replace the blade lock system in which the preferred embodiment uses the swashplate linkage system by engaging latch 67 with pin 69. The linkages 71 extend from the fuselage 1 by actuators 73 and grasp each individual rotor blade 3 by latching mechanism 75 at pin 77 to fix said rotor blades to said fuselage.

The use of servo flaps is well described by Kaman in U.S. Pat. No. 2,455,866 which is incorporated herein by this reference. A conventional servo flap changes the pitch of a rotor blade by moving in the opposite direction to increase camber. For example, if an increase in pitch is desired the servo flap will be moved up, thereby inducing a moment about the pivot point and pitching the blade up. However, a natural damper exists by twisting the rotor blades in the use of a conventional servo flap. Because the rotor blade 3 may rotate freely about the bearings 65 in an undesirable manner dampening boots 79 may be employed between said rotor blade and hub 27 that can double as environmental protection. Also, because the rotor blades 3 are free to pitch and rely on airflow for correct positioning locking mechanisms 59 and 61 must be engaged prior to disengaging the rotor shaft to prevent blade pitching on the retreating blades at positions 33 and 35 near zero airspeed conditions.

The edge flaps 29 and 31 may also be used to directly affect the rotor blade 3 lift as described in transition mode when the swashplate 49 is set to neutral position. The embodiment uses of the edge flaps 29 and 31 to control the camber of the rotor blade 3 thereby changing its lift characteristics. The leading and trailing edge flaps 29 and 31 may be controlled individually by fixing the leading edge and modulating the trailing or fixing the trailing edge and modulating the leading edge. Said flaps may also be used in conjunction with one another to vary the camber. The rotor blades 3 in this embodiment will not pivot about axis 39. Therefore bearings 65 and locking mechanisms 59 and 61 are eliminated.

Although the preferred embodiment positions the rotor blades 3 at a 45 degree angle from longitudinal axis 19, this angle should not be construed to limit the scope of the present invention. Said rotor blades can be positioned at virtually any position including 0 and 90 degree angles from longitudinal axis 19. The preferred embodiment also advantageously describes the use of four rotor blades 3. Other embodiments may incorporate any number of rotor blades and still meet the intent and scope of the present invention.

Although this invention has been described above with reference to particular means, materials and embodiments, it is to be understood that the invention is not limited to these disclosed particulars, but extends instead to all equivalents within the scope of the preceding description, the following claims, and the enclosed drawings and attached Exhibit A.

I claim:

1. A rotary/fixed wing aircraft, comprising:
    a single annular wing with articulating rotor blade wings extending radially from a rotating hub to said annular wing, each of said articulating rotor blade wings comprising an edge flap, said annular wing configured to tilt with said blades when said blades are articulated;

a first control system for controlling the aircraft in rotary, helicopter mode;

a second control system for controlling the aircraft in fixed wing, airplane mode;

a locking mechanism for preventing the rotation of said rotor blade wings when said fixed wing airplane mode is desired;

a rotary shaft connected to a rotary motor; and a horizontal thrust producing engine.

2. The rotary/fixed wing aircraft of claim 1 wherein said adjustable rotor blade wings are configured to create a lift when rotated at a pre-selected speed.

3. The rotary/fixed wing aircraft of claim 1 wherein said adjustable rotor blade wings are shaped so as to be generally symmetrical from a vertical center.

4. The rotary/fixed wing aircraft of claim 1 wherein said adjustable rotor blade wings contain an internal structural spar located at a generally central location within said wing.

5. The rotary/fixed wing aircraft of claim 4 wherein said spar has a spar root that is connected to said rotating hub and a spar tip that is connected to said annular ring.

6. The rotary/fixed wing aircraft of claim 4 wherein the pitch of said blade about said internal structural spar is accomplished by bearings located along the length of said blade.

7. A rotary/fixed wing aircraft, comprising:

a single annular wing with articulating rotor blade wings extending radially from a rotating hub to said annular wing, said annular wing configured to tilt with said blades when said blades are articulated;

a first control system for controlling the aircraft in rotary, helicopter mode;

a second control system for controlling the aircraft in fixed wing, airplane mode;

a locking mechanism for preventing the rotation of said rotor blade wings when said fixed wing airplane mode is desired;

a rotary shaft connected to a rotary motor; and a horizontal thrust producing engine, said pitch of said rotary blade wings controlled by a swashplate and linkage system, said swashplate comprising a rotating portion and a non-rotating portion.

8. The rotary/fixed wing aircraft of clain 7 wherein the pitch of said rotary blade is controlled by a system comprised of rotor blade servo flaps and piezoelectric actuators.

9. The rotary/fixed wing aircraft of claim 7 further comprising a locking mechanism comprised of latches and pins.

10. A rotary/fixed wing aircraft, comprising:

a single annular wing with articulating rotor blade wings extending radially from a rotating hub to said annular wing, said annular wing configured to tilt with said blades when said blades are articulated;

a first control system for controlling the aircraft in rotary, helicopter mode;

a second control system comprised of piezoelectric rotor flaps, for controlling the aircraft in fixed wing, airplane mode;

a locking mechanism for preventing the rotation of said rotor blade wings when said fixed wing airplane mode is desired;

a rotary shaft connected to a rotary motor; and a horizontal thrust producing engine.

11. The rotary/fixed wing aircraft of claim 10 further comprising a control device for transferring control of said aircraft between said first control system and said second control system.

* * * * *